United States Patent
Lewandowski

(10) Patent No.: US 11,349,301 B2
(45) Date of Patent: May 31, 2022

(54) METHOD FOR OPERATING A SENSOR ARRANGEMENT IN A MOTOR VEHICLE ON THE BASIS OF A DSI PROTOCOL

(71) Applicant: Valeo Schalter und Sensoren GmbH, Bietigheim-Bissingen (DE)

(72) Inventor: Marek Lewandowski, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 303 days.

(21) Appl. No.: 16/638,288

(22) PCT Filed: Aug. 9, 2018

(86) PCT No.: PCT/EP2018/071593
§ 371 (c)(1),
(2) Date: Feb. 11, 2020

(87) PCT Pub. No.: WO2019/034511
PCT Pub. Date: Feb. 21, 2019

(65) Prior Publication Data
US 2020/0176976 A1    Jun. 4, 2020

(30) Foreign Application Priority Data

Aug. 15, 2017   (DE) ...................... 10 2017 118 567.4

(51) Int. Cl.
H04L 12/40    (2006.01)
H02H 9/00    (2006.01)
G06F 13/40    (2006.01)

(52) U.S. Cl.
CPC ............. *H02H 9/004* (2013.01); *G06F 13/40* (2013.01); *H04L 12/40* (2013.01); *H04L 2012/40273* (2013.01)

(58) Field of Classification Search
CPC .......... H04L 12/40; H04L 2012/40273; H02H 9/004
See application file for complete search history.

(56) References Cited

U.S. PATENT DOCUMENTS

| 2004/0116101 A1* | 6/2004 | Tazaki | .................. H04L 12/403 455/402 |
| 2009/0121776 A1* | 5/2009 | Nagase | ............. H04L 12/40182 327/434 |

(Continued)

FOREIGN PATENT DOCUMENTS

| DE | 10147512 A1 | 4/2003 |
| DE | 102012103907 A1 | 11/2013 |

(Continued)

OTHER PUBLICATIONS

Anonymous: "DSI3 Bus Standard", Feb. 16, 2011 (Feb. 16, 2011), pp. 1-45, XP055510946, Retrieved from the Internet: URL: https://www.dsiconsortium.org/downloads/DSI3_%20Bus_Standard_r1.00.pdf (45 pages).

(Continued)

*Primary Examiner* — Harry R Behm
(74) *Attorney, Agent, or Firm* — Osha Bergman Watanabe & burton LLP

(57) ABSTRACT

The invention relates to a method for operating a sensor arrangement (2) in a motor vehicle (1) on the basis of a DSI protocol in a Power Function Class mode, wherein the sensor arrangement (2) has a central unit (3) and a multiplicity of sensor units ($S_1, S_2, \ldots, S_N$), the central unit and the sensor units are connected to one another in series by means of a bus cable (4), the sensor units each have a test resistor ($R_{S1}, R_{S2}, \ldots, R_N$) connected in series with the bus cable, an electrical test load ($L_1, L_2, \ldots, L_N$) that can be connected to the bus cable, and an address counter ($A_1, A_2, \ldots, A_N$), having the following steps: transferring information between the central unit (Z) and the sensor units by means of a predetermined lower voltage ($V_{LOW-PWR}$) and a predetermined upper voltage ($V_{HIGH-PWR}$) as the respective bus voltage ($U_{Bus}$) in communication phases, supplying the sensor units with electrical energy by means of the central unit in energy supply phases in which an idle voltage ($V_{IDLE}$) is applied as the bus voltage, which is at least 1 V greater than the upper voltage, assigning a respective address to the individual sensor units in a previous address assignment phase by means of an address assignment voltage as the bus voltage, which is at least 1 V greater than the upper voltage.

13 Claims, 3 Drawing Sheets

(56) References Cited

U.S. PATENT DOCUMENTS

Figure 1:
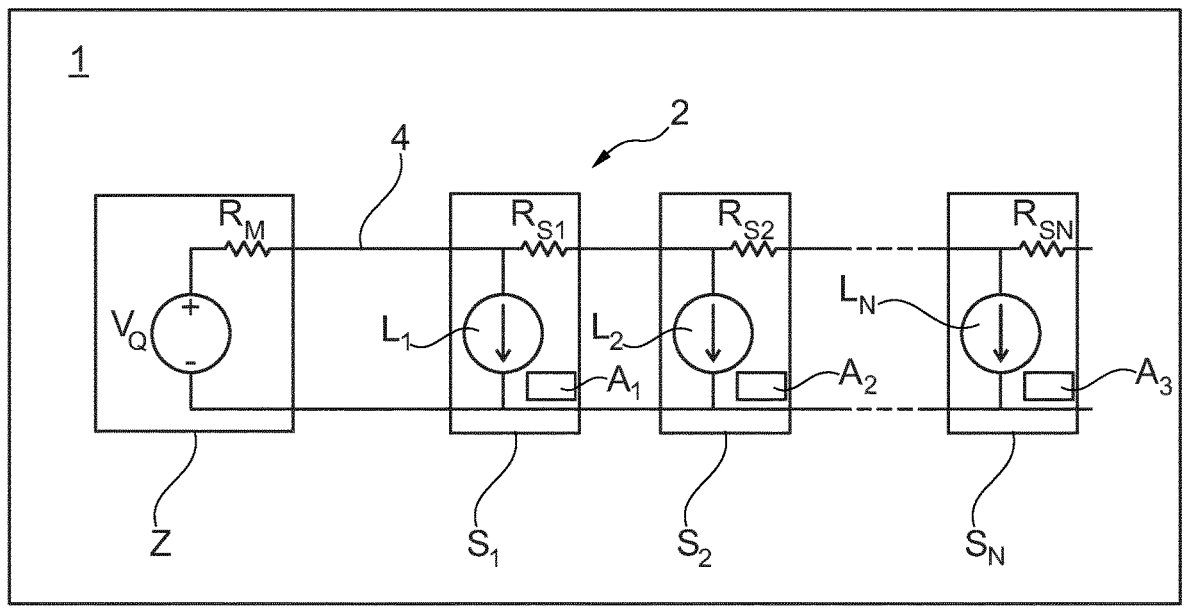

| | | | |
|---|---|---|---|
| 2011/0121858 A1* | 5/2011 | Cassagnes | H03K 19/00361 326/59 |
| 2011/0185093 A1* | 7/2011 | Matsuo | H04L 61/2038 710/110 |
| 2011/0208886 A1 | 8/2011 | Sugiura et al. | |
| 2016/0109489 A1 | 4/2016 | Krishna et al. | |

FOREIGN PATENT DOCUMENTS

| | | |
|---|---|---|
| DE | 102013226376 A1 | 6/2015 |
| EP | 2263102 B1 | 8/2013 |
| JP | 2014-241575 A | 12/2014 |
| WO | 2016/054345 A1 | 4/2016 |

OTHER PUBLICATIONS

International Search Report and Written Opinion corresponding to International Patent Application No. PCT/EP2018/071593, dated Nov. 7, 2018 (13 pages).

German Search Report issued in corresponding German Application No. 10 2017 118 567.4, dated May 22, 2018 (7 pages).

Decision of Rejection issued in Japanese Application No. 2020-508584, dated Jan. 4, 2022 (7 pages).

* cited by examiner

METHOD FOR OPERATING A SENSOR ARRANGEMENT IN A MOTOR VEHICLE ON THE BASIS OF A DSI PROTOCOL

The invention relates to a method for operating a sensor arrangement in a motor vehicle on the basis of a DSI protocol, wherein the sensor arrangement has a central unit as a master and a multiplicity of sensor units as slaves controlled by the master, the central unit and the sensor units are connected to a two-wire bus cable and communication between the central unit and the sensor units takes place via the two-wire bus cable. The invention also relates to the use of such a method in a motor vehicle, a sensor arrangement, and a motor vehicle having such a sensor arrangement.

The DSI Protocol Distributed System Interface, see: DSI3 Bus Standard, Revision 1.00 dated 16 Feb. 2011, the specification of which hereby forms part of the disclosure of the present invention by explicit incorporation, is a protocol that allows a sensor network to be built on the basis of a simple two-wire cable arrangement, in which a master communicates with one or more slaves via a two-wire bus cable. The DSI protocol is based primarily on the use in motor vehicles, in order to poll and/or control a multiplicity of slaves, in particular sensors and actuators, by means of the master.

The specification of the DSI protocol stipulates that such a sensor arrangement can be operated in one of two operational classes, these being the "Signal Function Class" and the "Power Function Class". The protocol also stipulates essentially three different modes in which the bus can be used between the master and the slaves:

In the CRM mode (Command and Response mode) a bi-directional communication takes place between the master and the slaves. The master sends a command (command), to which the slaves respond (response). This method is used, for example, to configure the slaves or to query specific values from a slave selectively.

In the PDCM mode (Periodic Data Collection mode) the slaves transfer comparatively large amounts of data to the master within a specified time slot, wherein the transmission activity of the master is confined to providing the slaves a reference point for determining this time slot by means of a synchronisation signal (Broadcast Read Command). The slaves have already been equipped with information about their respective time slot in advance, so that in response to the synchronisation signal they determine their respective transmission time interval, on the basis of which they can send their sensor data to the master.

In the energy supply phase, relatively large amounts of electrical energy are transferred in order to supply the slaves with high energy consumption with sufficient energy.

The above-mentioned Signal Function Class in accordance with the above-mentioned specification is used primarily for the connection of slaves with low energy consumption and relatively high data traffic, which is to be sent from the slave to the master. After commissioning a sensor arrangement of the Signal Function Class, a first phase of the communication takes place between the master and the slave in the CRM mode, during which the slave is usually configured, for example in relation to the parameters of the above-mentioned PDCM time slot for this slave. Once this phase is completed, the sensor arrangement thus changes over into the PDCM mode, in which the slaves always transmit the acquired data to the central entity in the respective assigned time slot in response to the synchronisation signal of the master. This phase in the PDCM mode is usually not exited again until the operation of the sensor arrangement is interrupted. An energy supply phase is not provided in accordance with the Signal Function Class, and on account of the low energy consumption of the slaves nor is it required.

The above-mentioned Power Function class is used primarily for the connection of slaves with relatively high energy consumption and relatively low data traffic, which is to be sent from the master to the slave. In the operation of a sensor arrangement of the Power Function class, phases of the communication between the master and the slave in the CRM mode take place alternately with energy supply phases. The durations of the energy supply phases usually greatly predominate.

For the bus voltage, the DSI3 bus standard defines different voltage ranges for the energy supply phases, on the one hand, and the communication phases on the other. For the communication phases an upper voltage $V_{HIGH\text{-}PWR}$ and a lower voltage $V_{LOW\text{-}PWR}$ are defined for transmitting information. The voltage $V_{HIGH\text{-}PWR}$ should be 4 V and must have a maximum value of 4.5 V and a minimum value of 3.5 V. The $V_{LOW\text{-}PWR}$ should be 2 V and must have a maximum value of 2.25 V and a minimum value of 1.75 V. The bus voltage during the energy supply phases is referred to as an idle voltage $V_{IDLE}$, must not exceed 25 V and must be at least 1 V higher than the voltage $V_{HIGH\text{-}PWR}$ that is used. Thus if the system were to be operated with the minimum permissible voltage of 3.5 V for $V_{HIGH\text{-}PWR}$, then $V_{IDLE}$ must be at least 4.5 volts. As an aside, the use of the term idle voltage is derived from the fact that during the energy supply phase the sensor units are in the idle mode, in the sense that they only receive electrical energy and are not controlled to carry out any actions.

Supplying a comparatively large amount of energy to the slaves in these phases at a higher voltage compared to the CRM mode means, in particular, that actuators can be operated, wherein this is usually carried out on the basis of control commands transmitted previously from the master to the slave in the CRM phase. The PDCM mode is not applicable in accordance with the Power Function class, because with the above-mentioned actuators, due to the low data volume it is also not required.

The DSI3 bus standard allows, inter alia, the central unit and the sensor units to be connected to each other in series, i.e. in a so-called daisy-chain configuration. Depending on their position in this series arrangement, the sensor units are assigned an address. Given a number N of sensor units these respective addresses of the sensor units are typically from 1 to N, where adjacent sensor units have addresses that differ by exactly 1. A method of distributing such addresses to the sensor units is defined in the DSI3 bus standard, which is referred to as "Discovery Mode". To this end, the sensor units typically have a test resistor arranged in series with the two-wire bus cable, and a load which can be connected to the two-wire bus cable. In the discovery mode this load is the load which is also connected to the two-wire bus cable during communication with the central unit, in other words the communication load. In communication loads connected to the two-wire bus cable, a current flow occurs in all test resistors with the exception of the last sensor unit of the chain, behind which, of course, no communication load is present. In this way, in the discovery mode the respective last sensor unit in the chain can always be determined, so that by shutting off the communication load of the respective last sensor unit and successively incrementing the addresses in the sensor units an address assignment to the sensor units can be carried out, until finally all sensor units have received an address.

In the Power Function Class mode, especially with longer chains of sensor units, the internal resistance of the sensor units must be kept to a minimum, in order to avoid high voltage drops and thus high power losses in the sensor units. Due to the low internal resistances, the measurement of the voltage drop during the Discovery Mode can lead to incorrect results, since the voltages to be measured can be within the range of the noise. Therefore, the Discovery Mode defined in the DSI3 specification does not always operate reliably in a sensor unit in a daisy-chain configuration in the Power Function Class mode.

In WO 2016/054345 A1 an ultrasound system for monitoring the condition or the integrity of a structure is described, such as is used in the oil, gas or power generation industry. The system comprises a multiplicity of ultrasonic sensors and at least one digital sensor interface.

Document DE 10 2013 226 376 A1 describes a method for operating a sensor system with an ultrasonic sensor and a control unit, wherein data from the ultrasonic sensor to the control unit are current-modulated and data from the control unit to the ultrasonic sensor are voltage-modulated. This solution allows, after modification of an appropriate PSI5 data bus interface, just such a data bus and a LIN data bus for data transmission to be combined with one another to exploit the advantages of the two bus systems.

In DE 10 2012 103 907 A1 a method is described for operating a receiver unit of a motor vehicle control unit which is connected to a transmitter unit. The receiver unit appends an identifier to the received signal, which contains a virtual address of the transmitter unit. This can be used to connect a sensor unit according to the PSI5 Version1 standard to a motor vehicle control unit which processes signals in the PSI Version2 standard.

Finally, EP 2 263 102 B1 describes an ultrasound-based driver assistance system having a plurality of sensors. The sensors are each assigned a unique identification code, which can be read out by a control unit via an interface. The interface is a 2-wire bus interface which is designed to comply with a Peripheral Sensor Interface (PSI).

It is the object of the invention to specify methods with which addresses can be distributed to the sensor units of a sensor arrangement designated for a motor vehicle on the basis of a DSI protocol, including in a Power Function Class mode, in a robust and reliable way.

This object is achieved by means of the subject matter of the independent claims. Preferred extensions of the inventions are described in the dependent claims.

According to the invention therefore, a method is provided for operating a sensor arrangement in a motor vehicle on the basis of a DSI protocol in a Power Function Class mode, wherein the sensor arrangement has a central unit as a master and a multiplicity of sensor units as slaves controlled by the master, the central unit and the sensor units are connected to one another in series by means of a two-wire bus cable, the sensor units each have a test resistor connected in series with the two-wire bus cable, an electrical test load that can be connected to the two-wire bus cable, and an address counter, and at least three different operating phases are provided in the form of communications phases, on the one hand, and energy supply phases, on the other, that alternate with each other and an address assignment phase which precedes the communications phases and the energy supply phases, having the following steps:

transferring information between the central unit and the sensor units by means of a predetermined lower voltage and a predetermined upper voltage as the respective bus voltage in the communications phases, supplying the sensor units with electrical energy by means of the central unit in the energy supply phases, in which as the bus voltage an idle voltage is applied which is at least 1 V greater than the upper voltage, assigning a respective address to the individual sensor units in the address assignment phase by means of the following steps (a) to (f):

a) storing a first address in the address counters of all sensor units, wherein the first address is the same for all sensor units, b) applying an address assignment voltage as the bus voltage, which is at least 1 V greater than the upper voltage, c) connecting the electrical test loads of all sensor units to the two-wire bus cable so that the sensor units each draw a test current, d) detecting the current flowing through each of the test resistors, e) permanent disconnection of the electrical test load from the two-wire bus cable in the sensor unit in which no current has been detected flowing through the test resistor, and increasing the respective address by a predetermined equal value for all sensor units in the address counters of all other sensor units whose test load has not yet been permanently disconnected from the two-wire bus cable, f) repeating the steps d) and e) for all sensor units whose test load has not yet been permanently disconnected from the two-wire bus cable, until in all sensor units the electrical test load has been permanently disconnected from the two-wire bus cable.

A key aspect of the invention, therefore, is that in the address assignment phase, in which the sensor units are assigned their respective addresses, an address assignment voltage is used as the bus voltage which is at least 1 V greater than the upper voltage that is used for the exchange of information between the central unit and the sensor units in the communication phases. In addition, as in the regular Discovery Mode, the detection of the respective last sensor unit and the successive incrementing of the addresses in the sensor units takes place in a number of consecutive cycles.

In the present case when it is stated that a permanent disconnection of the electrical test load from the two-wire bus cable is provided in the sensor unit in which no current flowing through the test resistor has been detected, the word "permanent" means "in this address assignment phase". In a subsequent address assignment phase, when the addresses of the sensor units are re-assigned again, the electrical test load can self-evidently be connected to the two-wire bus cable again.

In so doing, the address assignment voltage does not need to be constant and always the same. Instead, it can vary in size and even briefly fall below the known lower limit. Preferably, however, the address assignment voltage remains permanently above the lower limit of 1V higher than the upper voltage for the communication phase.

The sensor units are preferably each actuators with a respective actuator load and each have a communication load that can be connected to the two-wire bus cable for communication purposes, wherein the respective actuator load is greater than the respective communication load and the actuator loads are used as test loads. In this way, the current flowing through the respective test resistors is increased, which further improves the detectability of the position of the respective sensor unit in the chain.

In accordance with a preferred extension of the invention, the following step is provided:

applying an address assignment voltage as a bus voltage, which is at least 1 V greater than the upper voltage and has a value of at least 50% of the idle voltage, preferably at least 90% of the idle voltage. In accordance with this preferred extension of the invention the address assignment voltage is chosen as high as possible, in order to be able to detect a current flowing through the test resistors as easily as possible.

To this end the following step can preferably also be provided:

applying an address assignment voltage as a bus voltage, which at least temporarily corresponds to the idle voltage. Thus here, the voltage with which the system operates as the address assignment voltage corresponds—at least temporarily—to exactly the voltage that is applied as the bus voltage to supply the sensor units with electrical energy in the energy supply phases.

The following step is also particularly preferably provided:

applying an address assignment voltage as a bus voltage which is at least temporarily equal to 25 V. It is therefore the case here that, regardless of whether as an idle voltage the maximum permissible voltage is actually applied as the bus voltage, the system in any case operates with the maximum permissible voltage as the address assignment voltage.

Preferably, it is also provided, that for step d) from the first repetition of this step onwards, the following applies:

d) disconnecting the electrical test load from the two-wire bus cable in all sensor units whose electrical test load has not yet been permanently switched off, and subsequently re-connecting the electrical test load to the two-wire bus cable in all sensor units whose test load has not yet been permanently disconnected from the two-wire bus cable, so that these sensor units each draw a test current, and detecting the current flowing through each of the test resistors of these sensor units.

In accordance with this preferred extension of the invention, the test loads are completely disconnected from the two-wire bus cable at the end of a cycle and for the next cycle and then switched on again. It is preferable here that the electrical test loads of the sensor units are connected to the two-wire bus cable in steps c) and d) gradually over at least two stages, in such a way that only a part of the test load is activated in the first stage and the test load is then gradually increased in the following stage or in each of the following stages. It is particularly preferably provided that no further increase in the test load in the sensor units is made in any subsequent stage, if in the previous stage a current flowing through the test resistance of the respective sensor unit has been detected which has exceeded a predetermined threshold. In this way, overloading of the central unit can be avoided, since it has already been reliably detected due to the flow of a lower current that this sensor unit is not the last one in the chain.

The address assignment is essentially free, and any addresses can be assigned which guarantee a unique identification of the respective sensor units. Preferably, however, the first address is 1, and the addresses are always increased by 1 in each case. This results in the addresses 1, 2, . . . N if the number of sensor units is N.

In a similar way to the regular Discovery Mode, the address assignment to the sensor units is preferably initiated by the central unit by a voltage signal with a predetermined voltage value, such as $V_{LOW-PWR}$ with a value of 2 V, and a predetermined duration, such as 24 µs. Then, also in a similar way to the regular Discovery Mode, prior to the start of the individual cycles in which the respective last sensor unit in the chain is detected a delay time is preferably provided in order to avoid the influence of potentially arising charging currents on the address assignment.

In accordance with a preferred extension of the invention, the sensor units are ultrasonic sensor units for sending and/or receiving ultrasonic signals.

The invention also relates to the use of a method in a motor vehicle as previously described, and to a non-volatile, computer-readable storage medium with commands stored thereon, which when executed on a processor implement a method as described earlier. The invention also relates to a sensor arrangement which is configured to operate by means of a method as previously described. Finally, the invention also relates to a motor vehicle having such a sensor arrangement.

In the following, the invention is described in greater detail with reference to the drawings based on preferred exemplary embodiments. The features described can represent an aspect of the invention both individually and in combination.

Figure 2:
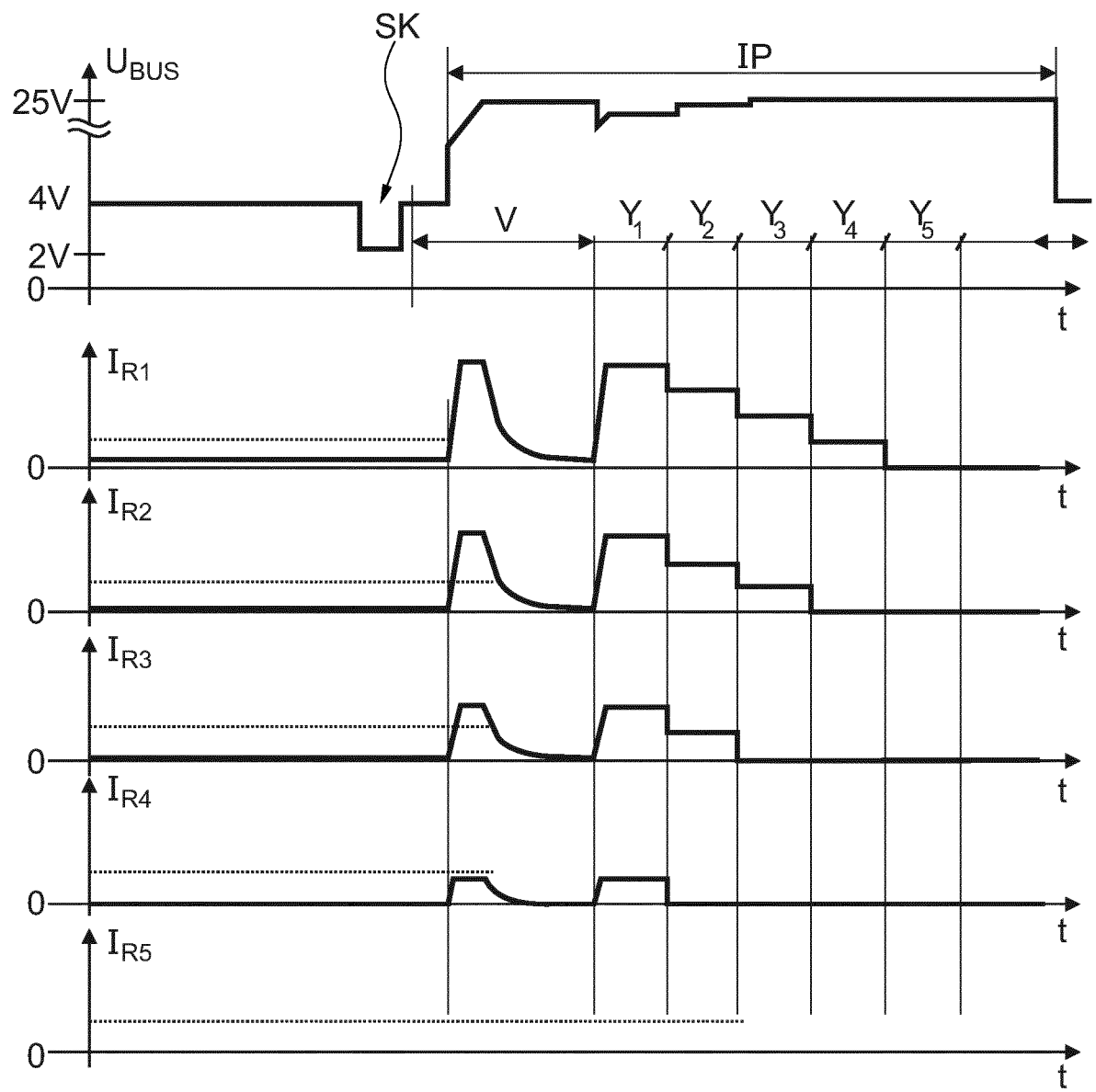
Figure 3:
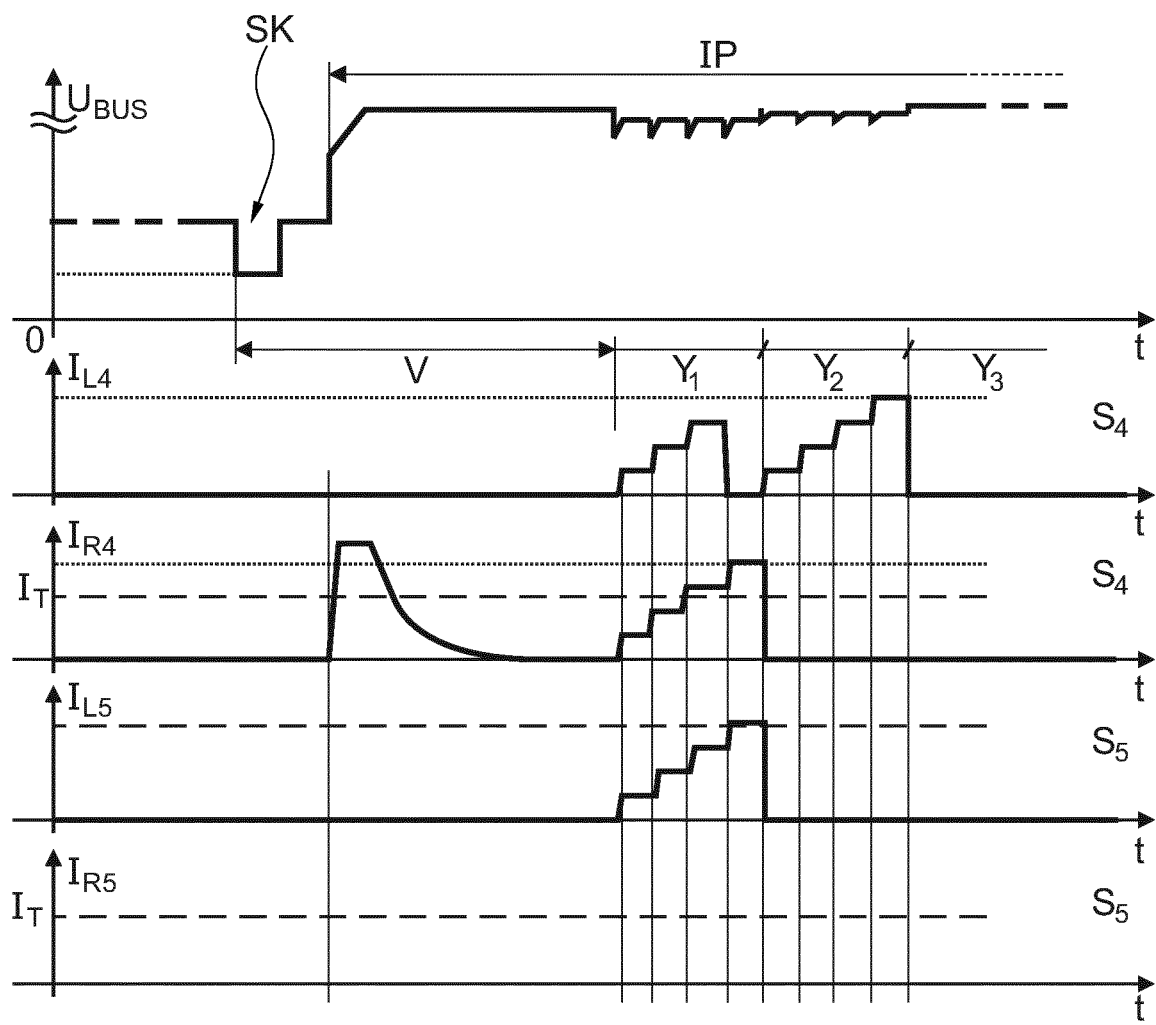

Shown are:

FIG. 1 a schematic view of a sensor arrangement with a central unit and a multiplicity of sensor units in a motor vehicle according to a preferred embodiment of the invention, FIG. 2 a schematic view of the process of address assignment to the sensor units of a sensor arrangement according to a preferred exemplary embodiment of the invention and FIG. 3 a schematic view of the process of address assignment to the sensor units of a sensor arrangement according to another preferred exemplary embodiment of the invention.

FIG. 1 shows a schematic representation of a vehicle 1 having a sensor arrangement 2 according to a preferred exemplary embodiment of the invention. The sensor arrangement 2 has a central unit Z and a number N of sensor units $S_1, S_2, \ldots, S_N$. The central unit Z and the sensor units $S_1, S_2, \ldots, S_N$ are connected to each other by means of a two-wire bus cable 4. It remains the case furthermore that the sensor units $S_1, S_2, \ldots, S_N$ are connected with one another in series with the central unit Z, i.e. in a so-called daisy chain configuration.

Within the meaning of the above-mentioned DSI3 specification the central unit Z represents a master which is connected via the two-wire bus cable 4 to the sensor units $S_1, S_2, \ldots, S_N$ acting as slaves in the sense of the DSI3 specification, with the result that overall a bus in the sense of the DSI3 specification is present. Furthermore, in the present case the sensor units $S_1, S_2, \ldots, S_N$ are sensor units with actuators that have a relatively high energy consumption, so that the operation of this sensor arrangement 2 falls under the above-mentioned Power Function class. As already explained above, in the operation of the present sensor arrangement 2 of the Power Function class, energy supply phases, on the one hand, and communication phases, on the other, will therefore take place alternately.

In the communication phases, information is transferred between the central unit Z and the sensor units $S_1, S_2, \ldots, S_N$ by means of a lower voltage $V_{LOW-PWR}$ of 2V and an upper voltage $V_{HIGH-PWR}$ of 4 V as the respective bus voltage, while in the energy supply phases the sensor units $S_1, S_2, \ldots, S_N$ are supplied with electrical energy by the central unit Z. In these energy supply phases the bus voltage applied $U_{Bus}$ is an idle voltage $V_{IDLE}$, which is at least 1 V greater than the upper voltage $V_{HIGH-PWR}$. In the present case the bus operates with an idle voltage which is the maximum permissible voltage of 25 V or only slightly below it.

However, before the communication phases can be started, addresses must be assigned to the sensor units $S_1$, $S_2$, ..., $S_N$. To do this, the sensor units $S_1$, $S_2$, ..., $S_N$ each have an address counter $A_1$, $A_2$, ..., $A_N$ in which each address can be stored. In accordance with a first exemplary embodiment of the invention, the following is provided:

The sensor arrangement 2 according to the first exemplary embodiment of the invention, in accordance with the drawing in FIG. 1 and a central unit Z, has a number N=5 sensor units $S_1$, $S_2$, ..., $S_N$ each with a test resistor $R_{S1}$, $R_{S2}$, ..., $R_{SN}$ connected in series with the two-wire bus cable 4, each having a test load $L_1$, $L_2$, ..., $L_N$ that can be connected to the two-wire bus cable 4, and each with a previously mentioned address counter $A_1$, $A_2$, ..., $A_N$. The procedure for the address assignment is shown schematically in FIG. 2.

FIG. 2 shows, in each case as a function of time t, in the top curve the profile of the bus voltage $U_{Bus}$ and below it the respective currents $I_{R1}$, $I_{R2}$, $I_{R3}$, $I_{R4}$, $I_{R5}$ through the test resistors $R_{S1}$, $R_{S2}$, ..., $R_{SN}$. The procedure for assigning the addresses, i.e. the address assignment phase IP, is initiated by means of a start command SK, during which the bus voltage is decreased from 4 V to 2 V for a period of 24 μs. This is followed by a time delay V before the individual cycles $Y_1$, $Y_2$, $Y_3$, $Y_4$, $Y_5$, in which the sensor units check their relative position in their chain to avoid the influence of potentially occurring charging currents on the address assignment. During the time delay V, the bus voltage $U_{Bus}$ is thus already increased to the address assignment voltage of approximately 25 V or approximately 25 V; however, the test loads $L_1$, $L_2$, ..., $L_N$ are not yet connected to the two-wire bus cable 4.

This is followed by the first cycle $Y_1$ of the address assignment phase IP, in which all sensor units $S_1$, $S_2$, ..., $S_N$ connect their test loads $L_1$, $L_2$, ..., $L_N$ to the two-wire bus cable 4. On the basis of the test loads $L_1$, $L_2$, ..., $L_N$, which are located in the chain of the sensor units $S_1$, $S_2$, ..., $S_N$, in each case behind a respective sensor unit $S_1$, $S_2$, ..., $S_{N-1}$, a current $I_{R1}$, $I_{R2}$, ..., $I_{RN-1}$ flows through the test resistors $R_{S1}$, $R_{S2}$, ..., $R_{SN-1}$ respectively, which is greater the more sensor units $S_1$, $S_2$, ..., $S_N$ are still arranged behind a respective sensor unit $S_1$, $S_2$, ..., $S_{N-1}$. Only the test resistor $R_{SN}$ in the last sensor unit $S_N$ in the chain of the sensor units $S_1$, $S_2$, ..., $S_N$ has no current flowing through it, which is due to the fact that behind this last sensor unit $S_N$ there are no further sensor units with a test load, so that no current is drawn.

This last sensor unit $S_N$ receives the address 1 and takes no further part in the subsequent address assignment procedure. All other sensor units $S_1$, $S_2$, ..., $S_{N-1}$ increase their address by 1. In particular, the test load of the sensor unit $S_N$ with the address 1 is permanently disconnected from the two-wire bus cable 4 for the following cycles, so that in this respect the sensor unit $S_{N-1}$ becomes the "last" sensor unit in the chain, which is arranged directly in front of the sensor unit $S_N$ with the address 1. This procedure is repeated until all sensor units $S_1$, $S_2$, ..., $S_N$ are assigned an address, thus the current $I_{R1}$ has also become equal to zero since the sensor unit $S_1$ has then become the "last" sensor unit in the chain. The communication phases and energy supply phases can then start.

In the previously described preferred exemplary embodiment of the invention the total test load $L_1$, $L_2$, ..., $L_N$ has always been activated directly in each case; thus, the total maximum current has always flowed immediately as a result of these test loads $L_1$, $L_2$, ..., $L_N$. However, this can lead to the central unit Z becoming overloaded. To avoid this, in accordance with another preferred exemplary embodiment of the invention, as shown in FIG. 3 by way of example for the sensor units $S_4$ and $S_5$, in each cycle $Y_1$, $Y_2$, $Y_3$ the electrical test loads $L_1$, $L_2$, ..., $L_N$ of the sensor units $S_1$, $S_2$, ..., $S_{N-1}$ are connected to the two-wire bus cable 4 in stages with in this case overall a maximum of four stages, in such a way that in the first stage only a part of the test load $L_1$, $L_2$, ..., $L_N$ $L_1$, $L_2$, ..., $L_N$ is activated, namely a quarter of the maximum test load $L_1$, $L_2$, ..., $L_N$, and thereafter in the subsequent stages the test load $L_1$, $L_2$, ..., $L_N$ respectively is gradually increased, namely to two quarters, three quarters of the test load $L_1$, $L_2$, ..., $L_N$ and finally to the entire test load $L_1$, $L_2$, ..., $L_N$. In the sensor units $S_1$, $S_2$, ..., $S_{N-1}$, no further increase in the test load $L_1$, $L_2$, ..., $L_{N-1}$ takes place in a subsequent stage if in the previous stage a current $I_{R1}$, $I_{R2}$, ..., $I_{RN-1}$ has been detected flowing through the test resistor $R_{S1}$, $R_{S2}$, ..., $R_{SN-1}$ of the respective sensor unit $S_1$, $S_2$, ..., $S_{N-1}$, which has exceeded a predetermined threshold value $I_T$. In this case, the threshold value $I_T$ is equal to 60% of the current induced by a single test load.

In FIG. 3, in each case as a function of time t, the bus voltage $U_{Bus}$ is shown at the top and below it the current $I_{L4}$ on the basis of the test load $L_4$, the current $I_{R4}$ through the test resistor $R_4$ in the sensor unit $S_4$, the current $I_{L5}$ on the basis of the test load $L_5$ and the current $I_{R5}$ through the test resistor $R_5$ in the sensor unit $S_5$. For the sensor unit $S_5$ no current $I_{R5}$ has been detected through the test resistor $R_5$, because the sensor unit $S_5$ is the last sensor unit in the chain. For the sensor unit $S_4$ the threshold value $I_T$ of 60% of the maximum possible current has already been exceeded in the third stage, so that no further increase of the test load $L_4$ will take place in the fourth stage. The sensor unit $S_4$ "knows", simply due to the sufficiently high current $I_{R4}$ in excess of the threshold value $I_T$, that it is not the last sensor unit in the chain.

LIST OF REFERENCE SYMBOLS 1 motor vehicle
2 sensor arrangement
4 bus cable
$I_{R1}$, $I_{R2}$, ..., $I_{R5}$ current through the test resistors
$I_T$ threshold value for the current through the test resistors
IP address assignment phase
$L_1$, $L_2$, ..., $L_N$ test load
$R_{S1}$, $R_{S2}$, ..., $R_{SN}$ test resistors
$S_1$, $S_2$, ..., $S_N$ sensor units
SK start command
$U_{Bus}$ bus voltage
V time delay
$V_{HIGH-PWR}$ upper voltage
$V_{LOW-PWR}$ lower voltage
$V_{IDLE}$ idle voltage
$Y_1$, $Y_2$, ..., $Y_5$ cycles of the address assignment phase
Z central unit

The invention claimed is:

1. A method for operating a sensor arrangement in a motor vehicle on the basis of a DSI protocol in a Power Function Class mode, wherein
    the sensor arrangement has a central unit as a master and a multiplicity of sensor units as slaves controlled by the master, the central unit and the sensor units are connected to one another in series by means of a two-wire bus cable, the sensor units each have a test resistor connected in series with the two-wire bus cable, an electrical test load that can be connected to the two-wire bus cable, and an address counter, the method comprising:

at least three different operating phases provided in the form of communications phases, on the one hand, and energy supply phases, on the other, that alternate with each other, and an address assignment phase preceding the communications phases and the energy supply phases, having the following steps:

transferring information between the central unit and the sensor units by a predetermined lower voltage and a predetermined upper voltage as the respective bus voltage in the communications phases, supplying the sensor units with electrical energy by means of the central unit in the energy supply phases, in which as the bus voltage an idle voltage is applied, which is at least 1 V greater than the upper voltage, assigning a respective address to the individual sensor units in the address assignment phase by the following steps a) to f):

a) storing a first address in the address counters of all sensor units, wherein the first address is the same for all sensor units, b) applying an address assignment voltage as a bus voltage, which is at least 1 V greater than the upper voltage, c) connecting the electrical test loads of all sensor units to the two-wire bus cable, so that the sensor units each draw a test current, d) detecting the current flowing through each of the test resistors, e) permanent disconnection of the electrical test load from the two-wire bus cable in the sensor unit in which no current has been detected flowing through the test resistor, and increasing the respective address by a predetermined equal value for all sensor units in the address counters of all other sensor units, whose test load has not yet been permanently disconnected from the two-wire bus cable, f) repeating the steps (d) and (e) for all sensor units, whose test load has not yet been permanently disconnected from the two-wire bus cable, until in all sensor units the electrical test load has been permanently disconnected from the two-wire bus cable.

2. The method according to claim 1, wherein the sensor units are each actuators with a respective actuator load and each have a communication load that can be connected to the two-wire bus cable for communication purposes, wherein the respective actuator load is greater than the respective communication load and the actuator loads are used as test loads.

3. The method according to claim 1, further comprising: applying an address assignment voltage as a bus voltage, which is at least 1 V greater than the upper voltage and equal to at least 50% of the idle voltage.

4. The method according to claim 3, further comprising: applying an address assignment voltage as a bus voltage, which at least temporarily corresponds to the idle voltage.

5. The method according to claim 3, further comprising: applying an address assignment voltage as a bus voltage, which is at least temporarily equal to 25 V.

6. The method according to claim 5, wherein the electrical test loads of the sensor units are connected to the two-wire bus cable in steps c) and d) in at least two stages, in such a way that in the first stage only a part of the test load is activated and then in the following stage or in the following stages each test load is gradually increased further.

7. The method according to claim 1, wherein for step d) from the first repetition of this step onward, the following applies:

d) disconnecting the electrical test load from the two-wire bus cable in all sensor units, whose electrical test load has not yet been permanently switched off, and subsequently re-connecting the electrical test load to the two-wire bus cable in all sensor units whose test load has not yet been permanently disconnected from the two-wire bus cable, so that these sensor units each draw a test current, and detecting the current flowing through each of the test resistors of these sensor units.

8. The method according to claim 7, wherein in the sensor units in a subsequent stage, no further increase in the test load is made when in the previous stage a current flowing through the test resistor of the respective sensor unit has been detected, which has exceeded a predetermined threshold value.

9. The method according to claim 1, wherein the first address is 1, and when the addresses are increased an increment of 1 is made in each case.

10. The method according to claim 1, wherein the method is performed in a motor vehicle.

11. A non-volatile, computer-readable storage medium having commands stored thereon, which when executed on a processor implement the method according to claim 1.

12. A sensor arrangement, which is configured for operation by the method according to claim 1.

13. The sensor arrangement according to claim 12, which comprises ultrasonic sensor units for sending and/or receiving ultrasonic signals as the sensor units.

* * * * *